Sept. 15, 1959     W. HUHTALA     2,903,731
PIPE BRUSH
Filed Dec. 19, 1956
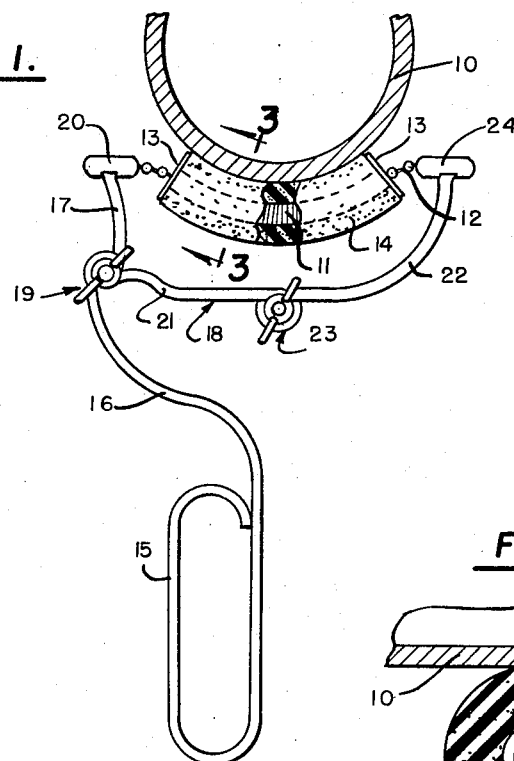
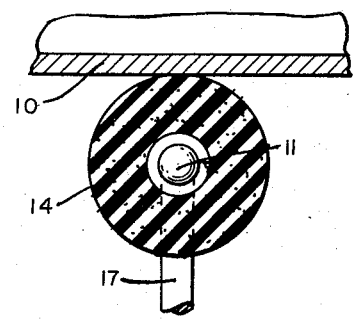
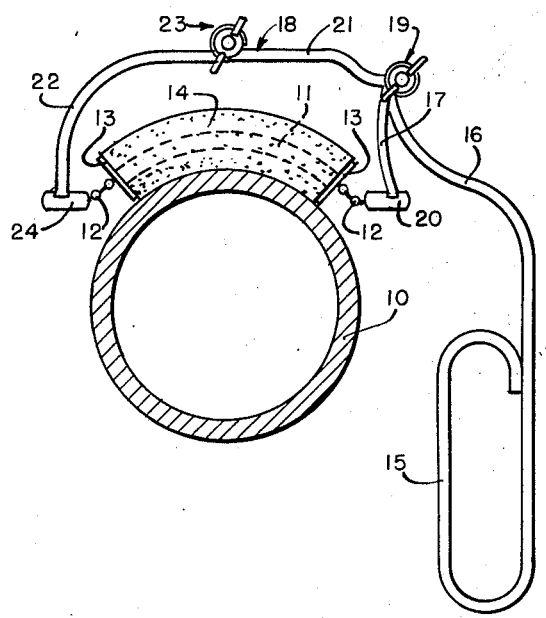
INVENTOR
William Huhtala

United States Patent Office 2,903,731
Patented Sept. 15, 1959

2,903,731

PIPE BRUSH

William Huhtala, Calumet, Mich.

Application December 19, 1956, Serial No. 629,396

2 Claims. (Cl. 15—230)

This invention relates to brushes for pipes.

It is an object of the present invention to provide a brush for painting pipes which will facilitate the painting of the same and which will bend to the contour of the pipe.

It is another object of the present invention to provide a brush for painting pipes of the above type which operates on the roller principle and which is particularly useful for painting pipes in hard to get at areas.

Other objects of the invention are to provide a brush for painting pipes bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which:

Figure 1 is a front elevational view of a preferred embodiment of the present invention shown partly broken away and in operative use;

Fig. 2 is a similar view to Fig. 1 but showing the device painting the hard to get at side of the pipe; and Fig. 3 is a sectional view taken along the line 3—3 of Fig. 1.

Referring now more in detail to the drawing, 10 represents a pipe which it is desired to paint, substantially as illustrated.

In the practice of my invention, a roller paint brush is provided for painting the pipe 10 and which bends under pressure to the contour of the pipe without stopping the roller action and includes a coil spring 11 through which is threaded a beaded chain 12, plugs not shown being provided at the ends of the spring 11 to prevent displacement thereof from the chain 12. A washer 13 is provided at the ends of the chain and is positioned on the beaded chain 12. An absorbent roller 14 surrounds the spring 11 intermediate the washer 13. The absorbent roller 14 may be made up of a plurality of separable discs or may be of unitary construction, as shown. In any event, the roller 14, which will apply the paint to the pipe 10, will follow the shape of the spring 11.

Means are provided for bringing the roller assembly thus described into operative engagement with the face of the pipe 10 and include a loop shaped handle 15 integrally formed at its upper end with the upwardly and inwardly curved portion 16 of substantially S-shaped configuration. A first terminal member 17 is pivotally connected to the upper end of the portion 16 along with an L-shaped member 18 by means of the wing nut assembly indicated generally at 19. The other end of the member 17 mounts the terminal portion 20 to which is secured one end of the chain 12 in suitable manner.

The L-shaped member 18 includes the relatively straight portion 21 and the curved portion 22 which is pivotally connected to the portion 21 by means of the wing nut assembly indicated generally at 23 the other end of the portion 22 terminating in a terminal member 24 which mounts the other end of the chain 12.

When the device is arranged as shown in Fig. 1, it may be used for painting the easy to get at areas of the pipe 10, by gripping the handle 15 and moving the roller 14 thereagainst with the necessary pressure, the spring 11, conforming to the contour of the pipe 10 and carrying therewith the roller 14. For painting difficult, or otherwise inaccessible areas of the pipe 10, the portions 17, 21 and 22 are rotated through 180 degrees to the arrangement shown in Fig. 2, and locked thereat by means of the wing nut assemblies 19 and 23. Thus, the roller brush may be operated from the outside of the pipe 10 by means of the handle 15 with the roller 14 positioned against the inaccessible surface area. Thus, to paint this part of the pipe, it is only necessary to loosen the wing nut assembly 19 and to again tighten the same when the desired position has been achieved. The wing nut assembly 23 may be used to lock the portions 21 and 22 in any desired arc to be used to the best advantage.

It will be noted that regardless of how the roller is bent around the pipe, when painting, the roller will continue to rotate with hardly any effort and will in one easy stroke do a surface that would take repeated strokes with an ordinary paint brush or straight roller. The backs of pipes which are often neglected can easily be painted with this device. The roller adjusts itself to any pipe with just a slight pressure and the sponge rubber, felt or absorbent roller 14 which encircles the spring 11 stores the paint for a long time and therefore covers a large area. It reduces the time of painting and is excellent for painting the piping on TV towers on homes to prevent the same from rusting.

It will be noted that the roller construction described provides freedom to rotate regardless of the manner in which it is bent. The absorbent roller or discs 14 positioned over the spring provide perfect freedom of movement and impart to the roller a squeegee action.

While various changes may be made in the detail construction, it shall be understood that such changes shall be within the spirit and scope of the present invention as defined by the appended claims.

What I claim as new and desire to protect by Letters Patent of the United States is:

1. A roller paint brush for pipes comprising, in combination, a coil spring; an elongated flexible support threaded through the center of said spring and extending beyond the ends thereof; absorbent roller means positioned upon the outside of said spring adapted to store paint therewithin and to apply the same to the pipe; substantially U-shaped frame means mounting the ends of said flexible member; handle means; and means pivotally connecting said handle means to said frame means and for locking the same relative thereto to permit the rotation of said frame means through 180° to provide access to all sides of a pipe; said handle means comprising an elongated loop adapted to receive the fingers therethrough, said loop at the upper end being formed with a substantially S-shaped portion; said means pivotally connecting said frame comprising a wing nut assembly carried by the end of said S-shaped portion remote from said loop; said U-shaped frame comprising a relatively straight portion pivotally connected to said wing nut assembly at one end and to said flexible member at the opposite end, an intermediate portion connected to said wing nut assembly at one end, and an outwardly and upwardly curved portion connected to the other end of said intermediate portion by a second wing nut assembly, and the other end of said outwardly and upwardly curved portions of said frame mounting the other end of said flexible member.

2. A roller paint brush according to claim 1, said flexible member comprising a beaded chain connected to opposite ends of said frame, and washers on said chain at the ends of said roller.

References Cited in the file of this patent

UNITED STATES PATENTS

| | | |
|---|---|---|
| 1,436,155 | Domy | Nov. 21, 1922 |
| 2,168,842 | Kesteven et al. | Aug. 8, 1939 |
| 2,805,439 | Parker | Sept. 10, 1957 |

FOREIGN PATENTS

| | | |
|---|---|---|
| 16,886 | Norway | Dec. 18, 1906 |
| 21,123 | Great Britain | of 1901 |
| 58,177 | Norway | July 19, 1937 |
| 477,974 | Great Britain | Apr. 6, 1936 |